(12) United States Patent
Kachlic (10) Patent No.: US 9,716,347 B2
(45) Date of Patent: Jul. 25, 2017

(54) CONNECTOR WITH A VENT WALL WITH OPENINGS SIZED TO BLOCK ELECTROMAGNETIC INTERFERENCE

(71) Applicant: MOLEX INCORPORATED, Lisle, IL (US)

(72) Inventor: Jerry Kachlic, Glen Ellyn, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/116,613

(22) PCT Filed: Feb. 4, 2015

(86) PCT No.: PCT/US2015/014423
§ 371 (c)(1),
(2) Date: Aug. 4, 2016

(87) PCT Pub. No.: WO2015/120024
PCT Pub. Date: Aug. 13, 2015

(65) Prior Publication Data
US 2016/0359278 A1   Dec. 8, 2016

Related U.S. Application Data

(60) Provisional application No. 61/935,684, filed on Feb. 4, 2014.

(51) Int. Cl.
| H01R 13/648 | (2006.01) |
| H01R 13/6581 | (2011.01) |
| G02B 6/42 | (2006.01) |
| H01R 12/73 | (2011.01) |
| H01R 12/72 | (2011.01) |

(52) U.S. Cl.
CPC ....... *H01R 13/6581* (2013.01); *G02B 6/4268* (2013.01); *G02B 6/4277* (2013.01); *G02B 6/4284* (2013.01); *H01R 12/737* (2013.01); *H01R 12/721* (2013.01)

(58) Field of Classification Search
CPC  H01R 13/648; H01R 13/658; H01R 13/6581; H01R 13/6585; H01R 12/737; H01R 23/6873; G02B 6/4268; G02B 6/4277; G02B 6/4284
USPC ............ 439/607.04, 607.08, 607.31, 607.33
See application file for complete search history.

(56) References Cited

U.S. PATENT DOCUMENTS

| 5,167,531 | A | * | 12/1992 | Broschard, III | ... H01R 23/6873 439/541.5 |
| 5,797,770 | A | * | 8/1998 | Davis | ................. H01R 23/6873 439/607.27 |
| 6,377,470 | B1 | | 4/2002 | Hayward et al. | |
| 7,722,399 | B2 | * | 5/2010 | Scherer | ................ H01R 23/688 439/607.05 |

(Continued)

FOREIGN PATENT DOCUMENTS

| JP | 2006-254528 A | 9/2006 |
| TW | M441233 U | 11/2012 |

*Primary Examiner* — Chandrika Prasad
(74) *Attorney, Agent, or Firm* — Jeffrey K. Jacobs (57) ABSTRACT

A connector includes a cage that surrounds a housing. The cage defines two vertically spaced apart ports. A chamber is positioned between the ports. The chamber includes a vent wall that is angled to provide additional vent area so as to improve cooling of the connector. An aperture array in a rear wall of the cage can be used to further improve the cooling capabilities of the connector.

12 Claims, 13 Drawing Sheets

(56) References Cited

U.S. PATENT DOCUMENTS

| | | | |
|---|---|---|---|
| 2001/0012730 A1* | 8/2001 | Ramey | H01R 12/585 439/607.05 |
| 2001/0028550 A1 | 10/2001 | Miyake et al. | |
| 2007/0293084 A1 | 12/2007 | Ngo | |
| 2009/0298349 A1 | 12/2009 | Filipon et al. | |

* cited by examiner

CONNECTOR WITH A VENT WALL WITH OPENINGS SIZED TO BLOCK ELECTROMAGNETIC INTERFERENCE

RELATED APPLICATIONS

This application is a national phase of PCT Application No. PCT/US2015/014423, filed Feb. 4, 2015, which in turn claims priority to U.S. Provisional Application No. 61/935,684, filed Feb. 4, 2014, which is incorporated herein by reference in its entirety.

TECHNICAL FIELD

This disclosure relates to field of connectors, more specifically to field of connectors suitable for use with active electronics.

DESCRIPTION OF RELATED ART

There are two types of cable connectors that are commonly used for IO style connectors, passive connectors and active connectors. Passive connectors don't include active components and instead rely on an external chip to power the transmission of signals through the cable assembly. Active connectors, conversely, include active components that can amplify and/or retransmit the signal.

While passive components are desirable from a cost and reliability standpoint, as signaling frequencies have increased it has become more difficult to manage communication channels with passive connectors. Often a transceiver is placed some distance from an edge of a circuit board. Therefore, traces are provided in the circuit board and the traces extend from the transceiver to a receptacle connector mounted near the edge of the circuit board. It turns out that these traces are relative lossy for any type of board material that is reasonably cost effective and thus significant attenuation takes place over just 8 or 10 inches of traces. When the losses due to the board (both at the transmitting and receiving end) are taken into account the resultant channel may not be viable or may not provide sufficient margin for any reasonable connector design. Therefore, it is becoming increasingly desirable (from the standpoint of ensuring a viable communication channel) to use active connectors.

While active connectors help address some of the problems with existing architectures, they have a potential issue with thermal management. Active connectors generate waste heat and must be cooled if they are to be maintained at a temperature that does not damage the internal components. Existing receptacle designs have used concepts such as riding heat sinks or spring fingers to engage active plug connectors and help transfer thermal energy away. Such designs have certain mechanical limitations and therefore further improvements would be appreciated by certain individuals.

SUMMARY

A connector is provided that includes improved ventilation capabilities in a compact form factor. In an embodiment the connector include a cage that includes a first and second port vertically arranged and the cage extends around a housing that includes a first and second card slot aligned with the first and second ports, respectively. The housing supports a plurality of terminals that have contacts that extend into the card slots. A chamber is defined between the ports and in an embodiment the chamber can be formed with an insert. A vent wall is positioned in the chamber and is angled so as to provide additional surface area for apertures. A aperture array can be provided in a rear wall of the cage and the vent wall and the aperture array can be in communication so that air can flow through the connector from front to back (or from back to front). The vent wall can be at an angle of 15 degrees or more, as desired, and at an angle of 45 degrees the vent wall can have a vent area that is substantially great than what would otherwise be possible as the surface area increases by about 40% compared to a vertically arranged vent wall.

BRIEF DESCRIPTION OF THE DRAWINGS

The present invention is illustrated by way of example and not limited in the accompanying figures in which like reference numerals indicate similar elements and in which.

DETAILED DESCRIPTION

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

The depicted figures illustrate various embodiments of connector configurations that can provide improved ventilation. The depicted embodiments include connectors that are in a stacked and ganged configuration. In an alternative embodiment the connector could just be stacked, thus the depicted configurations are not intended to be limiting.

As depicted, a connector 10 includes a cage 20 that defines a first port 23 and a second port 24 that are vertically spaced apart. The cage 20 has a front face 21 that defines a plane P1 that extends vertically. The depicted plane P1 is shown as being small for purposes of illustration but in practice would extend along the full front face 21. The cage further includes a rear wall 32 that includes an aperture array 34.

Between the first port 23 and the second port 24 is a chamber 28 that provide an air pocket between the first and second ports. As air flows through the chamber 28 the air can help cool modules that are inserted into the ports. The chamber 28 can be defined by an insert 70 that includes an electronically conductive vent wall 80. The chamber 28 extends back to an EMI wall 60 that includes one or more notches 65 that allow air to flow past the EMI wall 60. The EMI wall 60 is optional but is beneficial to improving EMI performance and if included then the notches are helpful to allow for sufficient air flow.

Figure 1:
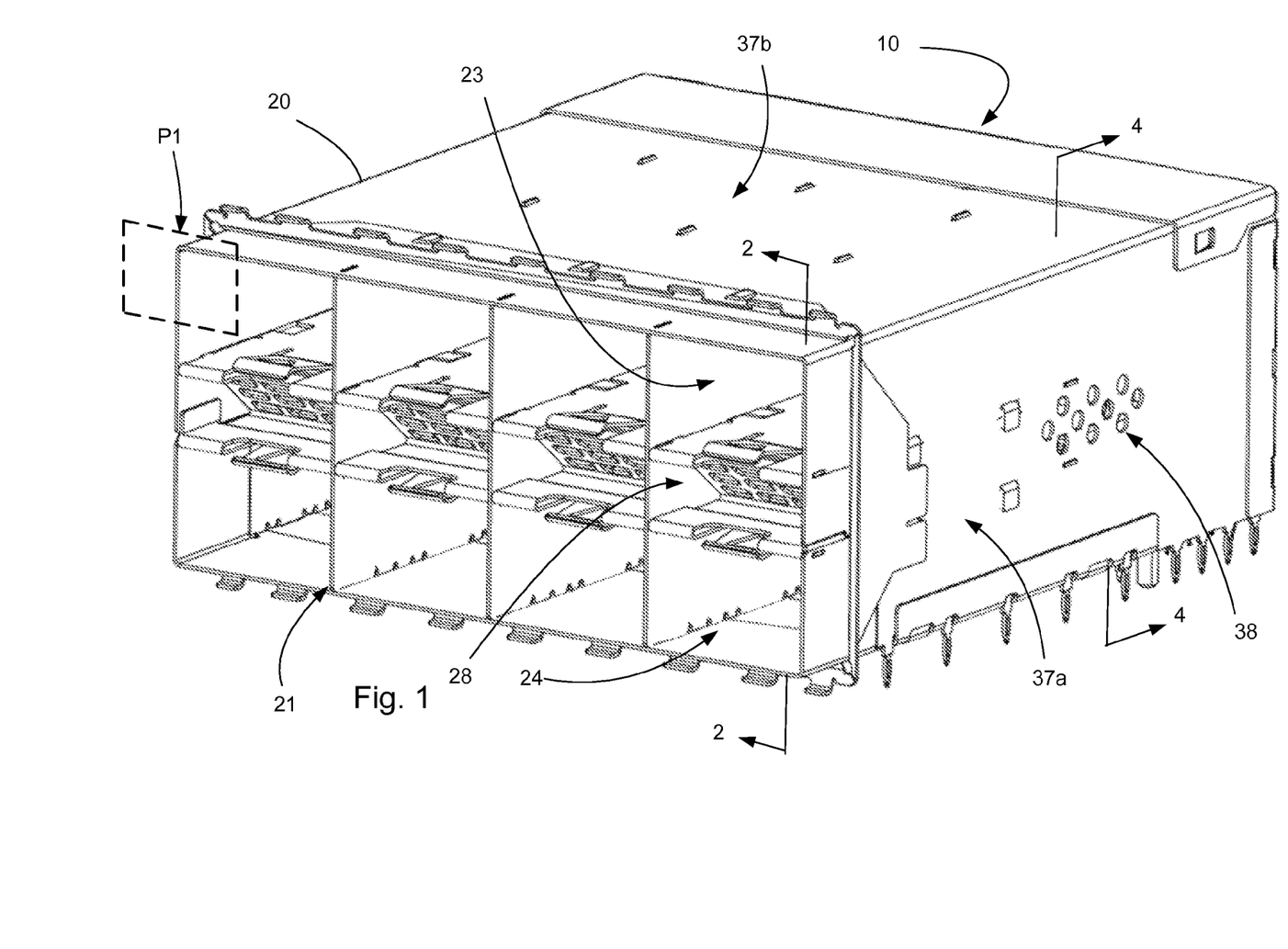
FIG. 1 illustrates a perspective view of an embodiment of a connector.
Figure 2:
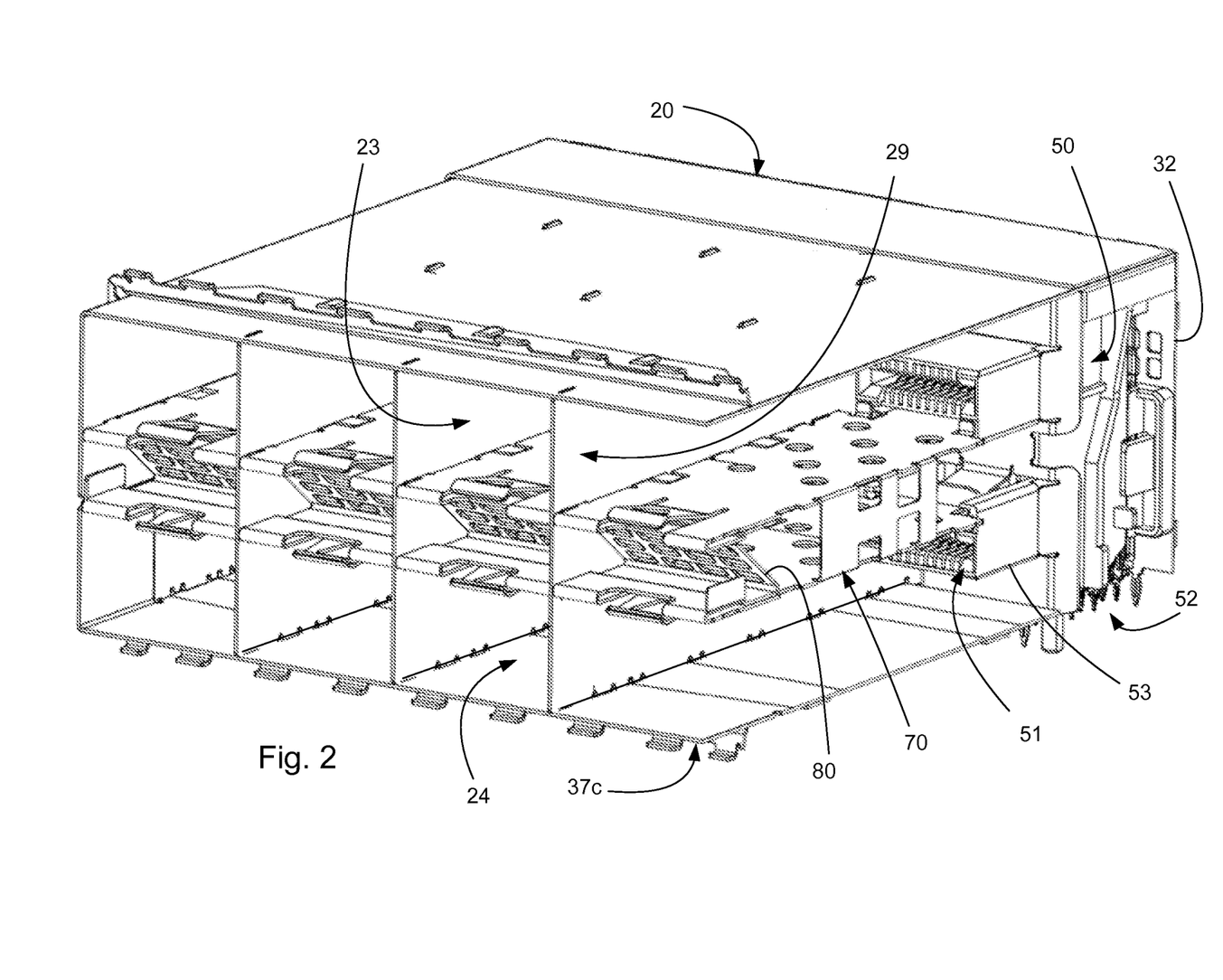
FIG. 2 illustrates a perspective cross sectional view taken along line 2-2 in FIG. 1.
Figure 3:
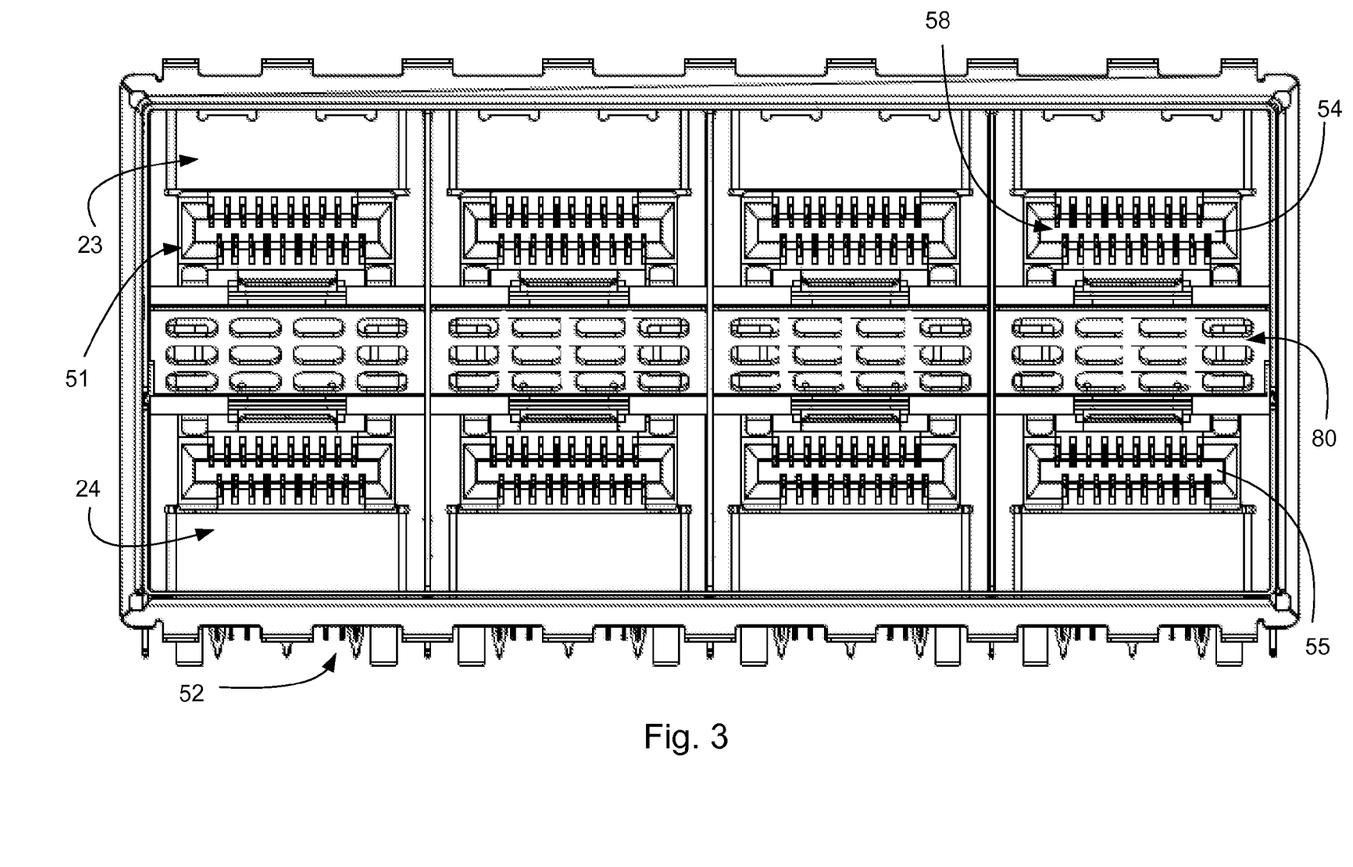
FIG. 3 illustrates an elevated front view of the embodiment depicted in FIG. 1.

The cage 20 includes sides 37a and a top wall 37b and a bottom wall 37c and is positioned around a housing 50 that includes a mating face 51 and a mounting face 52. The housing 50 includes a projection 53 that allows card slots 54, 55 (which are also vertically spaced apart) to be projected into the respective ports and such a construction is helpful in allowing for a secure connection to certain types of connectors but such a construction is not required. The housing 50 supports a plurality of terminals 58 that have tails positioned at the mounting face 52 and contacts positioned in both sides of the card slots 23, 24 near the mating face 51 (as can be appreciated from FIG. 3).

Figure 4:
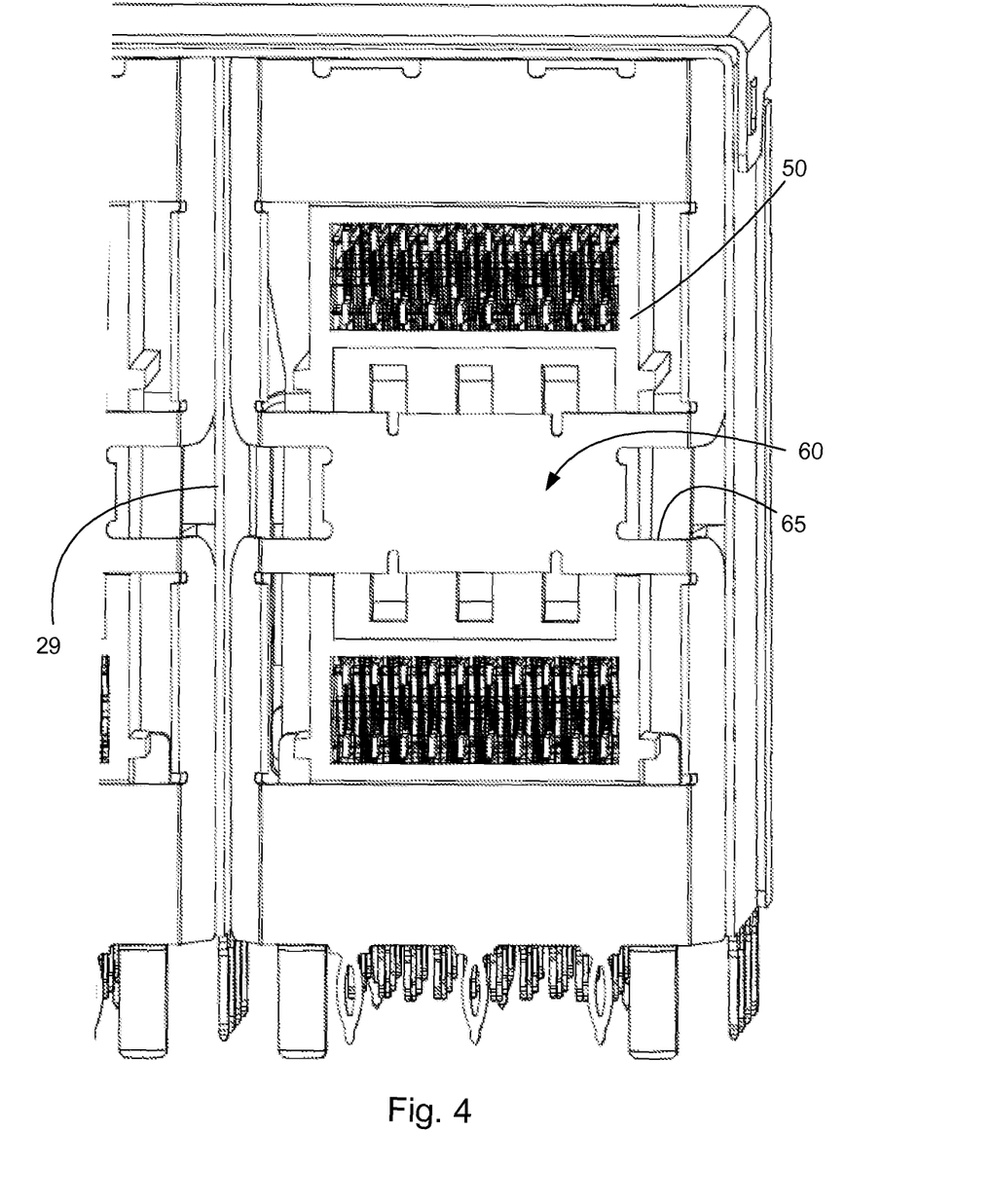
FIG. 4 illustrates a simplified perspective cross sectional view taken along line 4-4 in FIG. 1.
Figure 5:
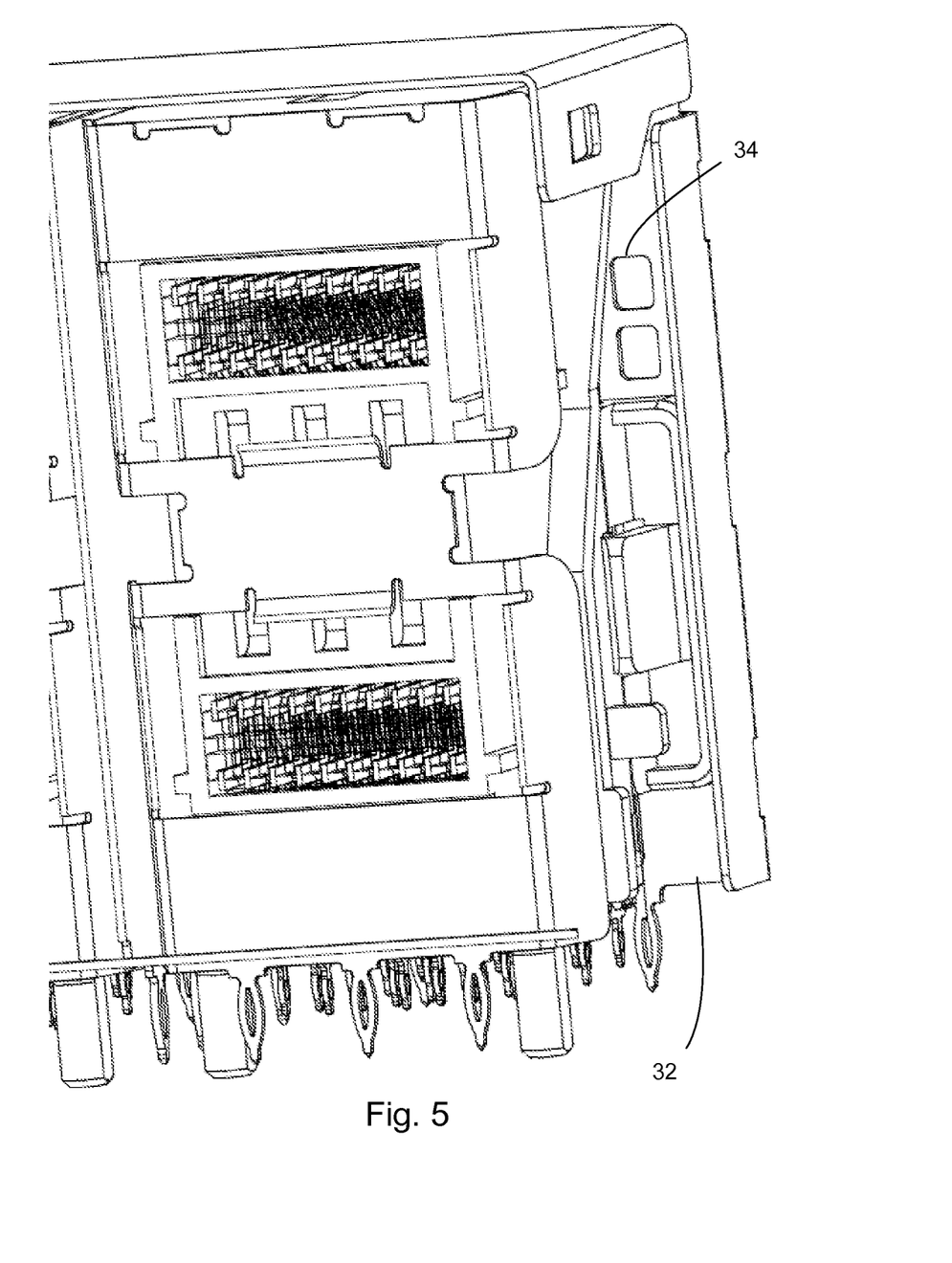
FIG. 5 illustrates another perspective view of the embodiment depicted in FIG. 4.
Figure 6:
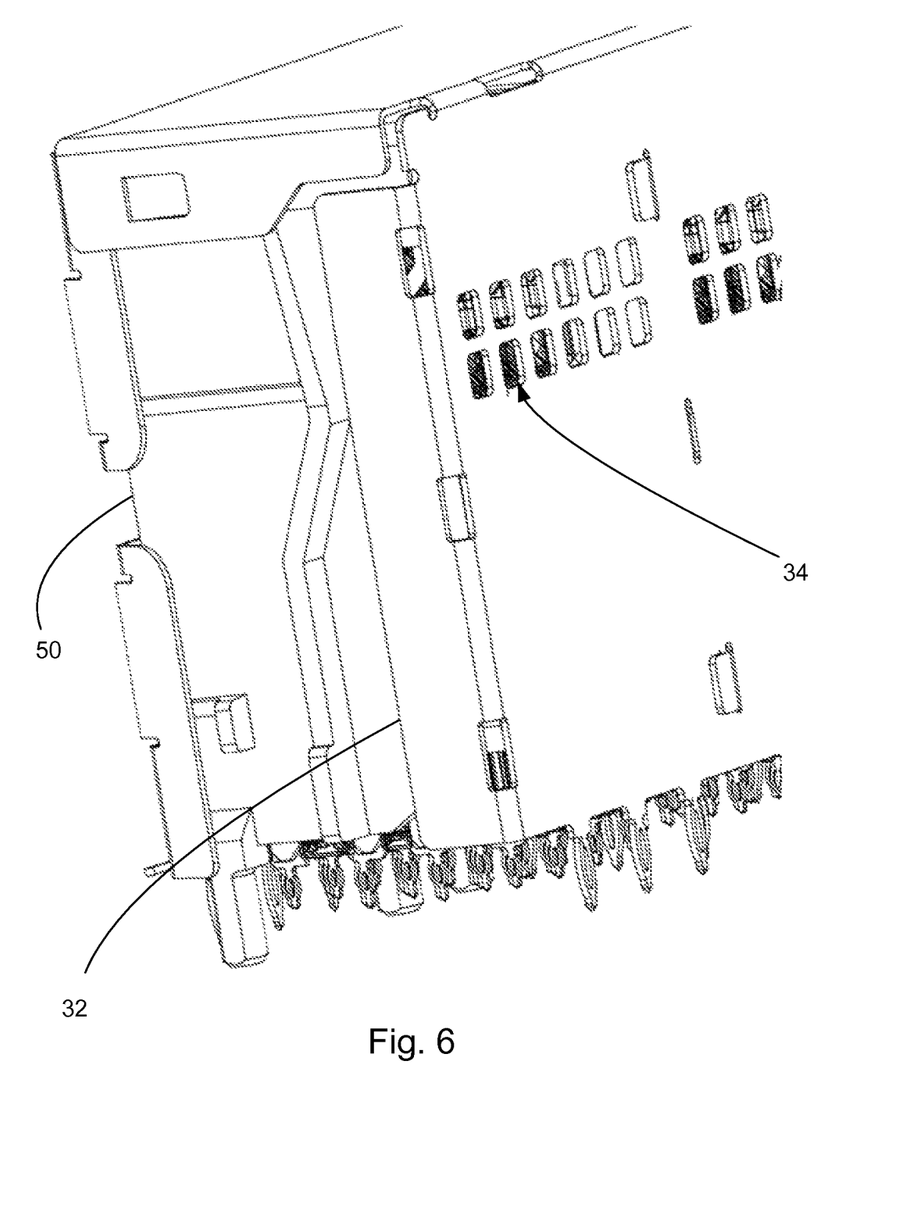
FIG. 6 illustrates another perspective vie of the embodiment depicted in FIG. 4.
Figure 7:
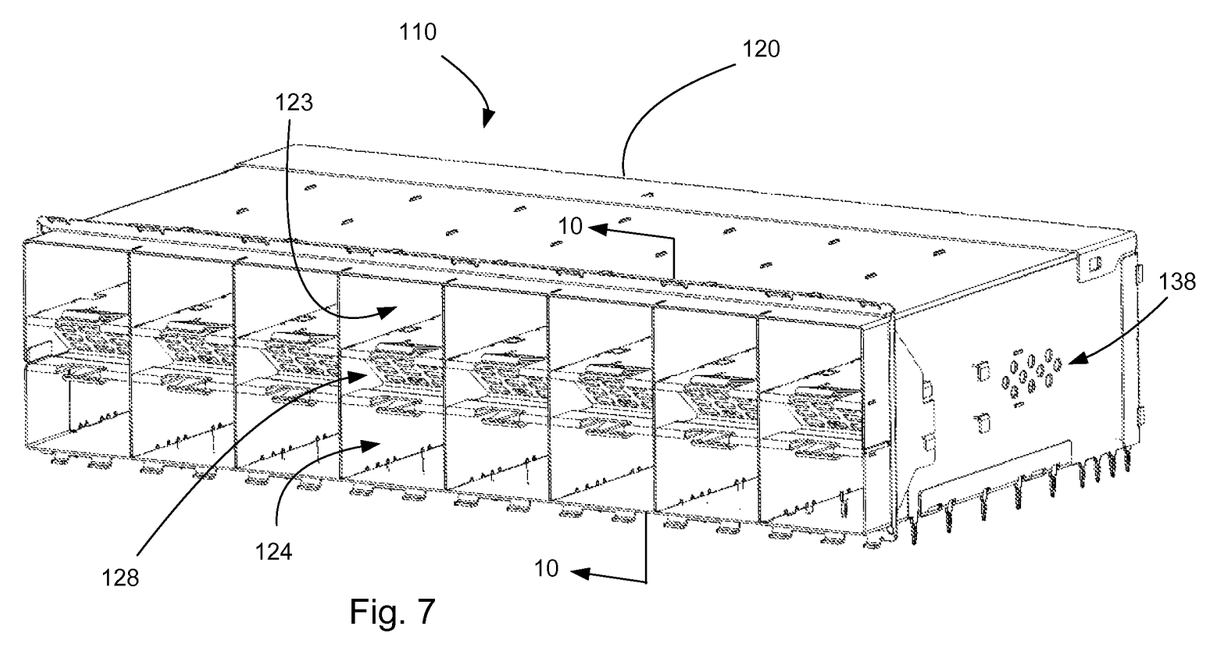
FIG. 7 illustrates a perspective view of another embodiment of a connector.
Figure 8:
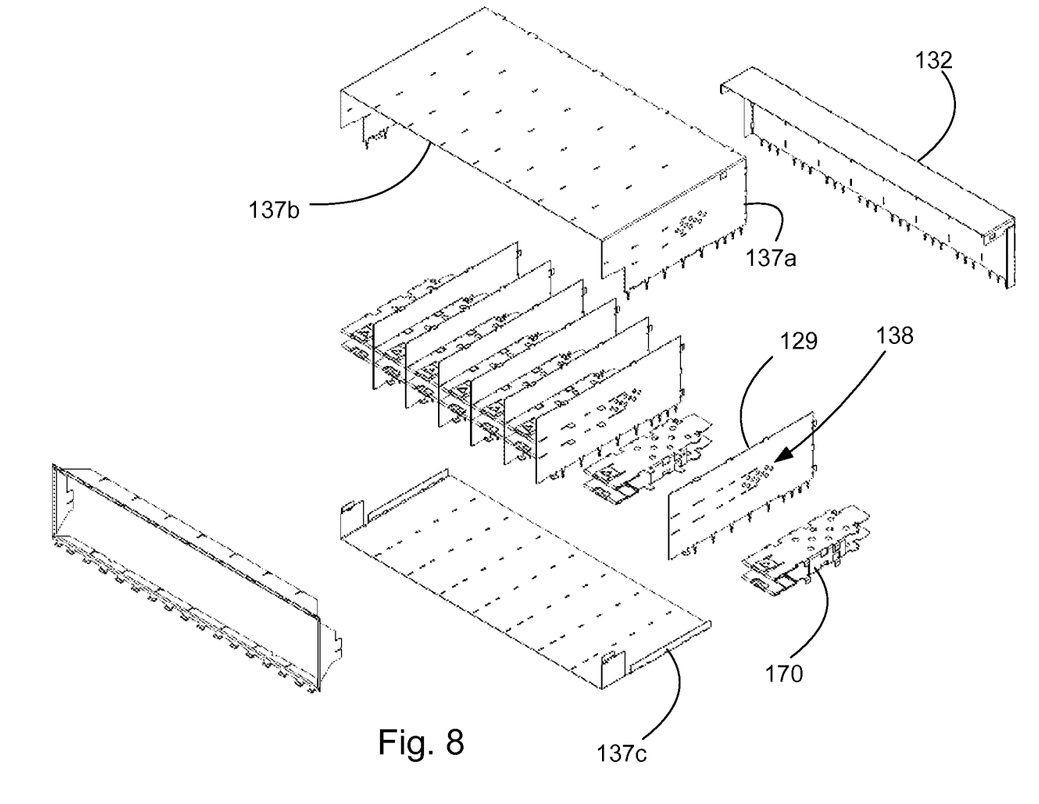
FIG. 8 illustrates a perspective exploded view of an embodiment of a cage.
Figure 9:
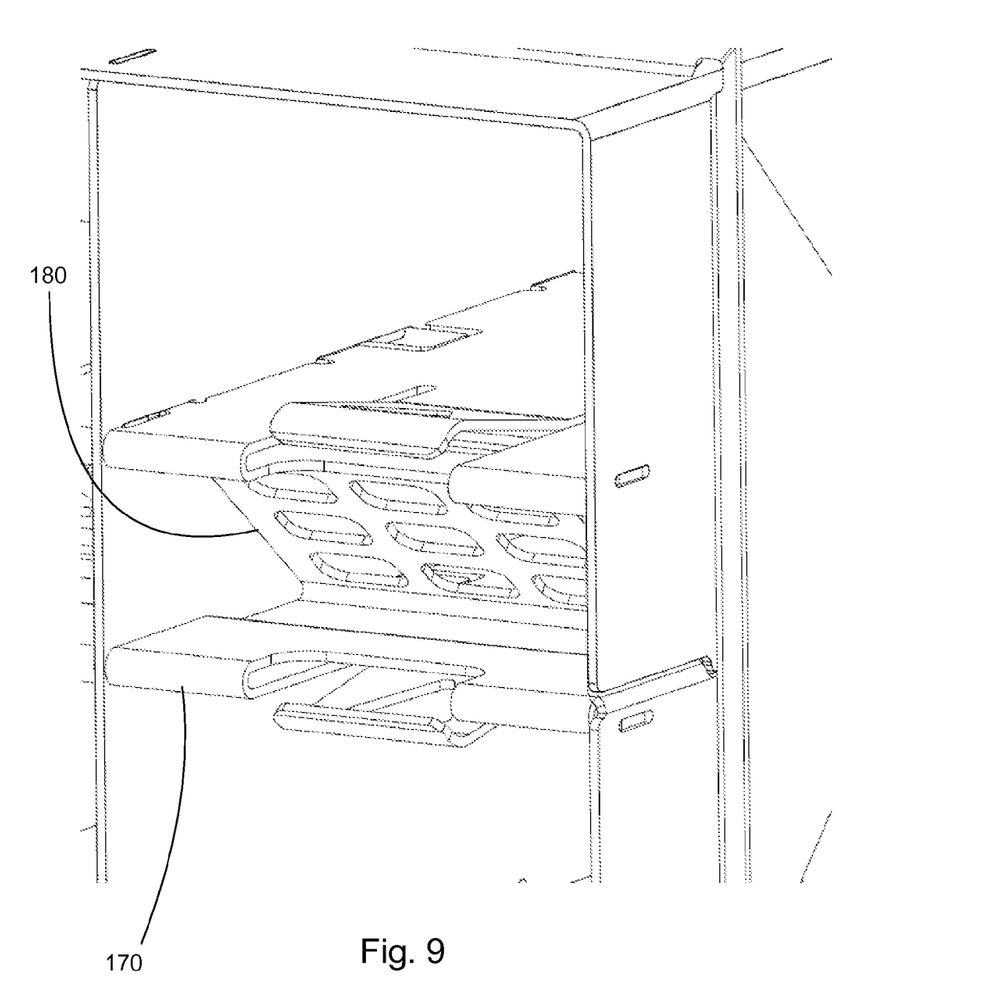
FIG. 9 illustrates a perspective enlarged view of a chamber and insert suitable for use in the embodiment depicted in FIG. 8.
Figure 10:
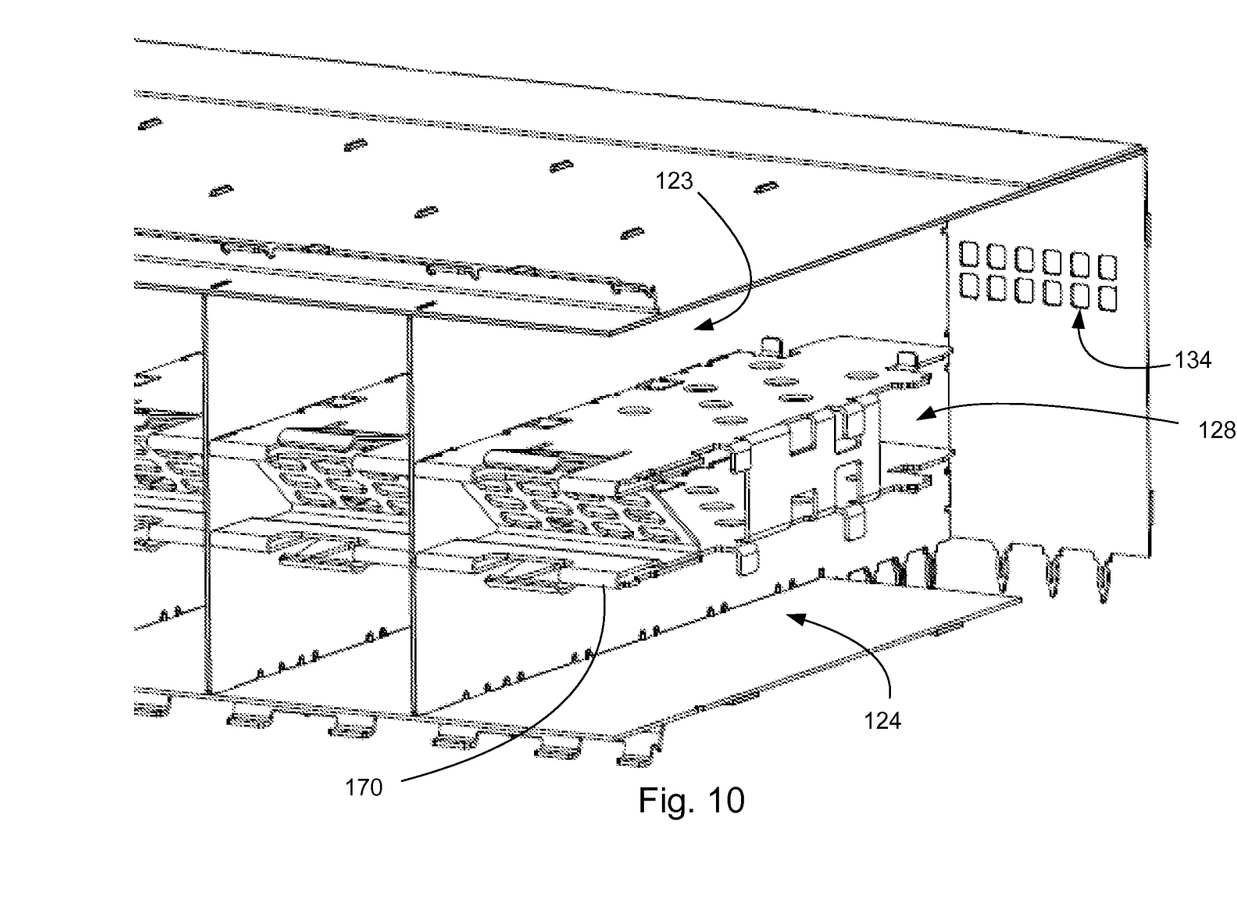
FIG. 10 illustrates a simplified perspective cross sectional view taken along line 10-10 in FIG. 7.
Figure 11:
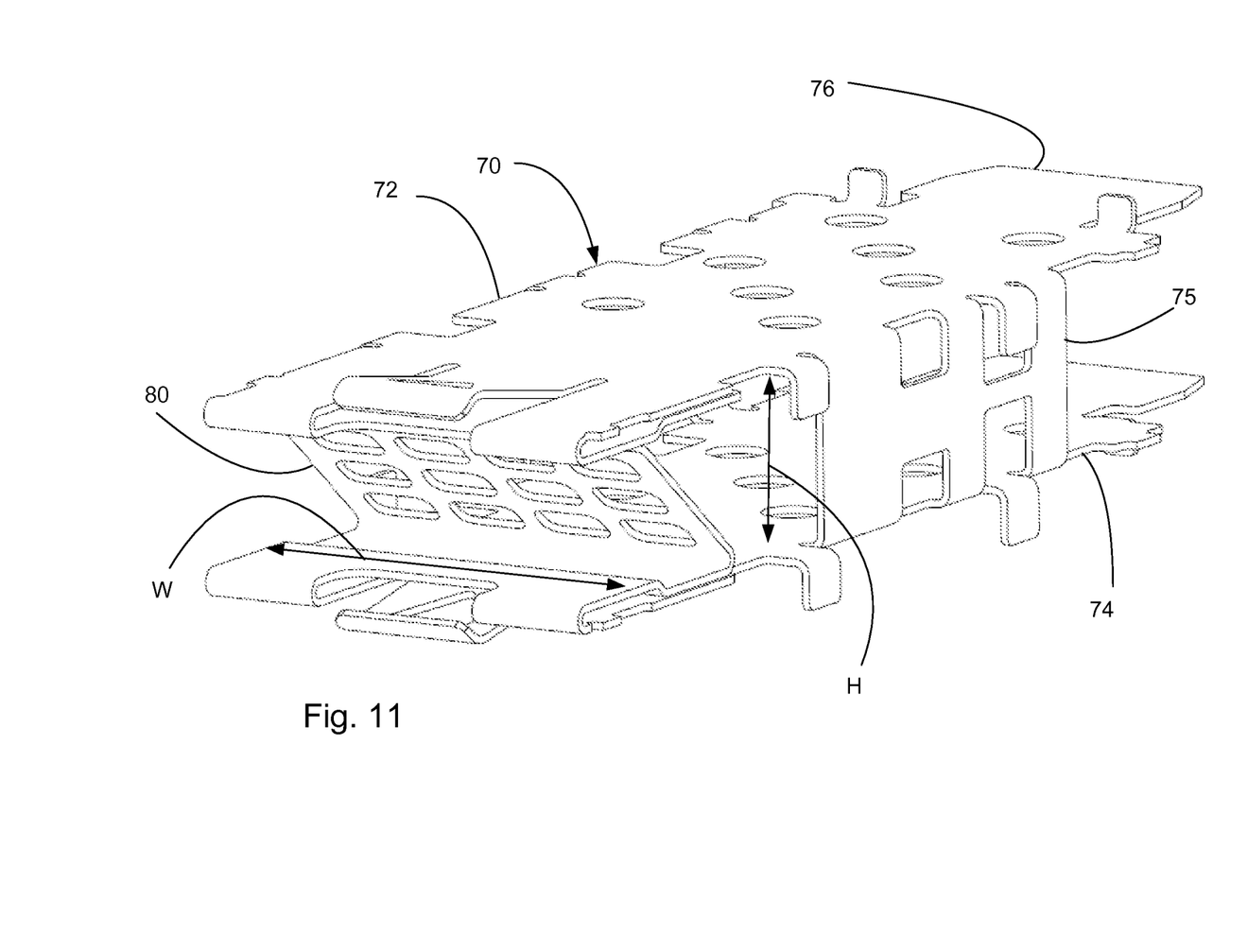
FIG. 11 illustrates a perspective view of an embodiment of an insert.
Figure 12:
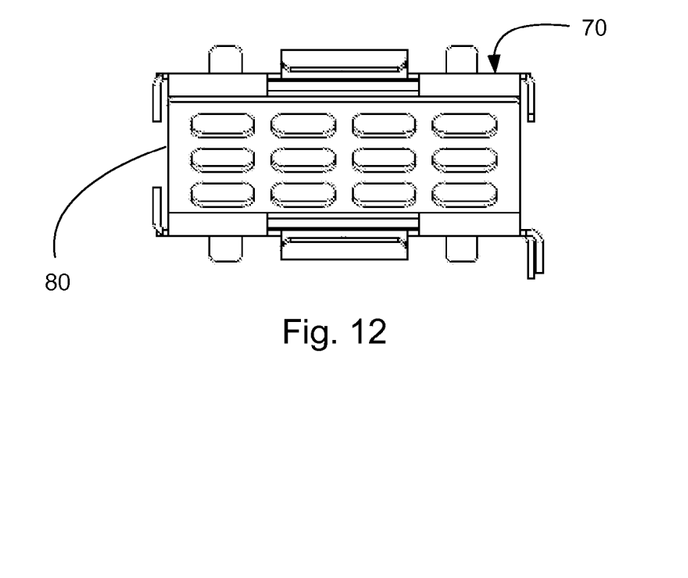
FIG. 12 illustrates an elevated front view of the insert depicted in FIG. 11.

The depicted cage 20 defines a plurality of vertically spaced apart ports and an interior wall 29 is positioned between adjacent ports. The sides 37a and the interior wall 29 include vent apertures 38 that allow air to flow from the chamber 28 out of the cage 20. Thus air can flow through the vent wall 80, into the chamber 28 and the out of the chamber 28 via the vent apertures 38. While the vent apertures 38 are beneficial, for higher thermal loads and for situations where the connector has a ganged configuration of 2×N where N is greater than 2 the vent apertures 38 are insufficient to allow for sufficient cooling. To help address this issue the housing 50 is configured so that there is air space on at least one side of the housing 50 (preferably on both sides of the housing as is depicted in FIG. 4) so that air can flow past the housing 50 and through rear wall vents 34.

As can be appreciated, the vent wall 80 is provided in between two ports and the vent wall 80 is angled. To provide the vent wall 80 an insert 70 can be used. The insert 70 includes a first wall 72 and a second wall 74 and the first and second walls 72, 74 are coupled by bridge 75. The insert 70 can also include a blade 76 that can be inserted or can engage a corresponding housing so as to provide a more robust structure. The vent wall 80 can be configured so that one end is a continuous part of the second wall 74 and an end 81 of the vent wall 80 presses against the first wall 72.

Preferably the vent wall 80 is angled at least 15 degrees from the plane P1 and more preferably is angled more than 30 degrees and it is expected that further benefits can be obtained if an angle of 45 degrees or more is provided. The vent wall 80, by being angled, can provide greater surface area so as to allow for additional apertures. The apertures, which may be limited in size to provide suitable EMI performance, can provide additional surface area due to the increased area provided by the vent wall and thus provide improved ventilation between the ports.

Figure 13:
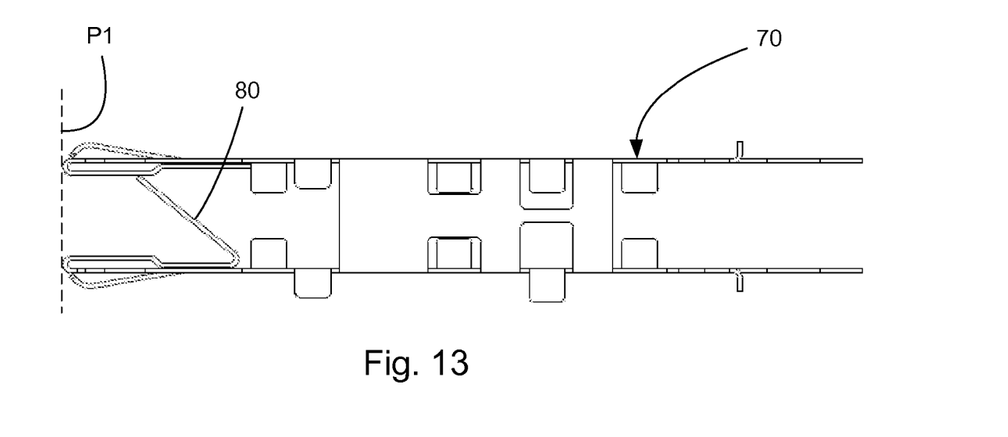
FIG. 13 illustrates an elevated side view of the insert depicted in FIG. 11.
Figure 14:
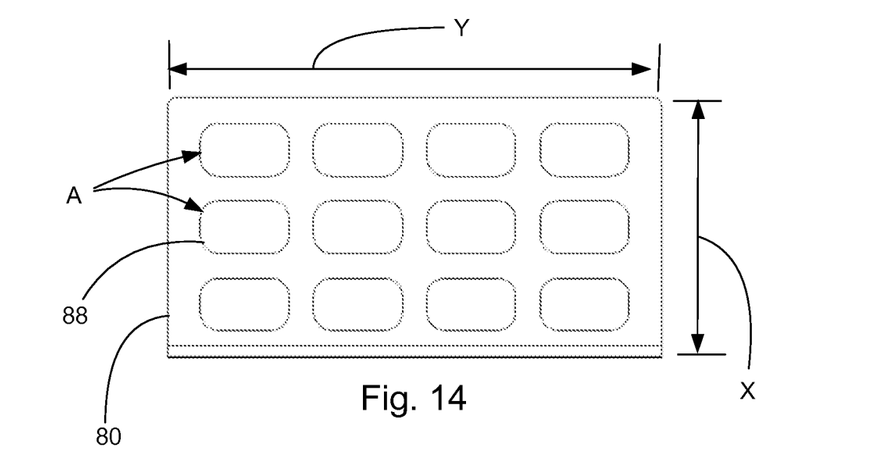
FIG. 14 illustrates an elevated front view of an embodiment of a vent wall.
Figure 15:
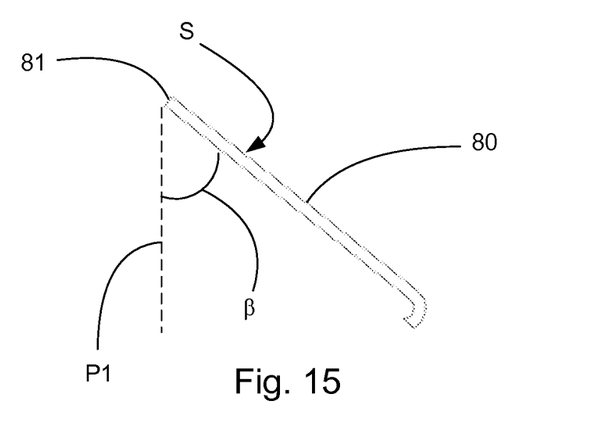
FIG. 15 illustrates an elevated side view of an embodiment of a vent wall.

As can be appreciated from FIGS. 13-15, the vent wall 80 has a length X and a width Y that define a surface area S, of which a vent area V is some portion of the surface area and the vent area V is defined as the sum of areas A of the apertures 88 or V=sum $(A_1:A_n)$ where n is the number of apertures provided in the vent wall. To allow for sufficient structural rigidity the vent area V will typically be less than 0.7 (S) and in many cases V≤0.6 (S). The upper limit on the percent of S that V can be will be determined by the materials used and the size of apertures 88 that are permissible for a given EMI performance (at 25 Gbps, for example, the size of the apertures preferably would be less than 7.5 mm so as to provide a safety factor). The width Y is determined based on width W of the chamber 28, which is defined by the size of the port (for example, the width of an SFP connector will be less than the width of a QSFP connector due to how the connectors are mechanically defined) and cannot be readily changed in many cases the width Y can be substantially the same as the width W. The chamber 28 also has a height H and this is defined by the mechanical dimensions of the connector. The length X is based on the first angle β and can be defined by the equation X=H/cos β. Thus, as angle β increases the length X also increases.

As can be appreciated, if the vent wall 80 was vertical (e.g., aligned with plane P1) then the vent area V could not exceed a percentage of the chamber area (where the chamber area is the width W times the height H). However, with an appropriate angle β the surface area S can substantially exceed the chamber area and area V can even equal or exceed the chamber area.

FIGS. 7-10 illustrate an alternative embodiment of a connector 110. While the internal aspects of the connector 110 can be substantially the same as connector 10 (and thus the details discussed above with respect to connector 10 can also apply to connector 110), the connector 110 includes 8 ports aligned side by side (e.g., connector 110 is a 2×8 connector). The additional ports arranged side by side makes the use of an aperture array in the rear wall more desirable as otherwise it is more difficult to provide sufficient air flow through the connector.

The connector 110 includes a cage 120 with side walls 137a, a top wall 137b and a bottom wall 137c and also includes a rear wall 132. The gage 120 further includes interior walls 129 and the walls help define first ports 123 and 124. An insert 170 is included and helps define a chamber 128 that is positioned between the first and second ports 123, 124. The cage 20 also includes vent apertures 138 and an aperture array 134. As can be appreciated, the insert 170 includes a vent wall 180 that is angled and allows for air flow through the connector 110 similar to how air can flow through the connector 10.

It should be noted that while an insert is preferred, the vent wall and the top and bottom of the ports could be formed of individual components and thus the insert could be omitted. Applicant has found it preferable to include an insert for ease of assembly and to provide additional structure rigidity.

Thus the connector includes a cage and a housing and the cage and housing can be configured so that the air can flow in through an angled vent wall, through a chamber, around the housing and out the back of the connector through apertures in a rear wall in the cage. The connector can thus be configured to cool active modules inserted into the connector without requiring excessively large heat sinks but instead using air flow through the connector to directly cool the active modules.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

I claim:

1. A connector, comprising:
    a housing that includes a mounting face and a mating face and a first card slot and a second card slot on the mating face, the first and second card slots being vertically spaced apart;
    a plurality of terminals supported by the housing, the terminals including tails arranged at the mounting face and contacts positioned in the card slots;
    a cage positioned around the housing, the cage having a front face that defines a first plane, the cage defining a first port and a second port that are aligned, respectively, with the first and second card slots, the cage including a chamber between the first and second ports; and
    an electrically conductive vent wall positioned in the chamber adjacent the front face, the vent wall having a plurality of openings sized so as to block electromagnetic interference (EMI), the vent wall arranged at a first angle from the first plane that is at least 15 degrees; wherein the plurality of openings collectively define a vent area.

2. The connector of claim 1, wherein the chamber has a first area corresponding to a height and a width of the chamber and the vent area is between 60% and 100% of the first area.

3. The connector of claim 1, wherein the first angle is at least 30 degrees from the first plane.

4. The connector of claim 3, wherein the first angle is about 45 degrees.

5. The connector of claim 1, wherein the first angle is between 15 and 45 degrees from the first plane.

6. The connector of claim 1, wherein the connector further comprises an insert positioned between the first and second ports, the insert defining the chamber.

7. The connector of claim 6, wherein the insert includes the vent wall integrally formed in the insert.

8. The connector of claim 7, wherein the insert includes a top wall and a bottom wall and is configured to have an end of the vent wall press against one of the top and bottom walls.

9. A connector, comprising:
    a housing that includes a mounting face and a mating face and a first card slot and a second card slot on the mating face, the first and second card slots being vertically spaced apart;
    a plurality of terminals supported by the housing, the terminals including tails arranged at the mounting face and contacts positioned in the card slots;
    a cage positioned around the housing, the cage having a front face that defines a first plane, the cage defining a first port and a second port that are aligned, respectively, with the first and second card slots, the ports having a first width; and
    an insert positioned between the ports, the insert including a first wall that forms a bottom of the first port and a second wall that forms a top of the second port, the first and second wall spaced apart by a first height such that the first height and the first width define a chamber, the insert including an electrically conductive vent wall positioned in the chamber adjacent the front face, the vent wall being angled and having a plurality of openings sized so as to block electromagnetic interference (EMI) and having a surface area that is greater than the first width times the first height; wherein the plurality of openings collectively define a vent area.

10. The connector of claim 9, wherein the first height and the first width define a chamber area and the vent area is between about 75% and 100% of the chamber area.

11. The connector of claim 9, wherein the vent wall is at a first angle that is at least 30 degrees from the first plane.

12. The connector for claim 9, wherein the cage includes a rear wall and an aperture array positioned in the rear wall, the aperture array in communication with vent wall so that air may flow from one to the other.

* * * * *